Dec. 25, 1928.
R. P. F. LIDDELL
FILTER
Filed March 22, 1926
1,696,313
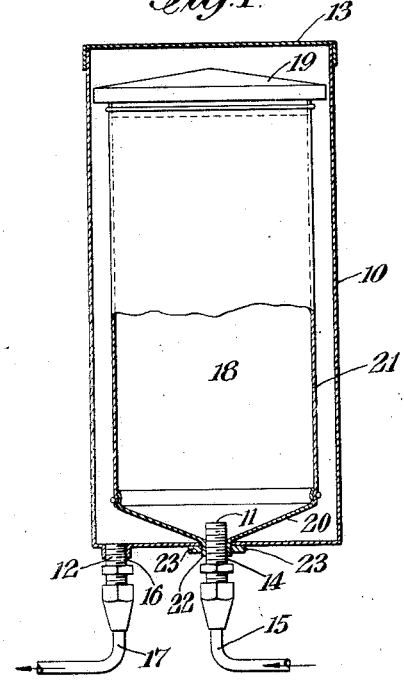
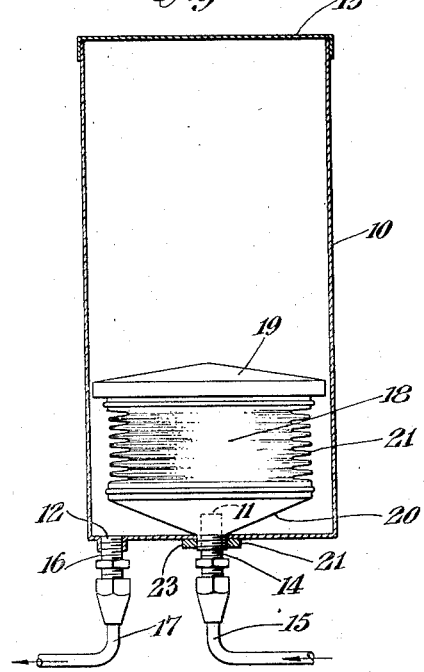
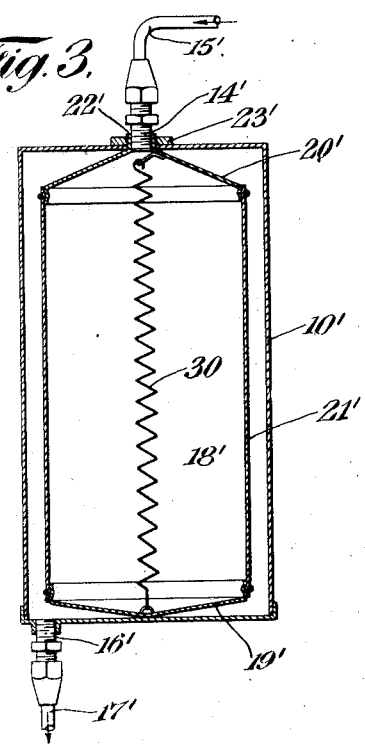
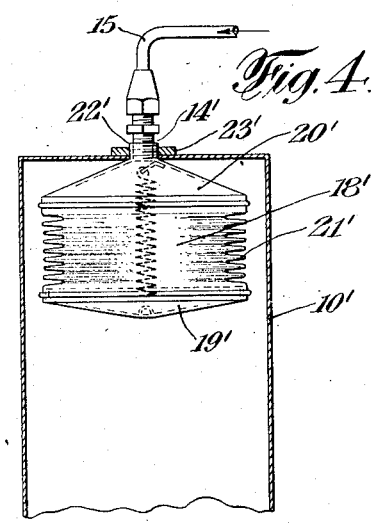
Inventor
Robert P. F. Liddell
By his Attorneys
Kenyon & Kenyon Patented Dec. 25, 1928.

1,696,313

UNITED STATES PATENT OFFICE.

ROBERT P. F. LIDDELL, OF NEW YORK, N. Y., ASSIGNOR, BY MESNE ASSIGNMENTS, TO CENTRAL UNION TRUST COMPANY OF NEW YORK, TRUSTEE.

FILTER.

Application filed March 22, 1926. Serial No. 96,444.

This invention relates to filters and has for an object a self cleaning filter. The invention is particularly applicable to systems wherein the pressure of the matter to be filtered is variable, such as automobile lubricating systems.

In filters of the type wherein a filtering medium is maintained in a fixed position, impurities form a cake upon the surface of the medium as liquid to be filtered passes therethrough. In a short time the medium becomes so incrusted with the impurities or cake as to lose its filtering property, necessitating removal and cleaning with a consequent interruption in operation of the system.

The present invention eliminates this objectionable feature by providing a filter which functions as such when the liquid to be filtered is introduced thereinto under pressure and which operates in such a manner as to cause cleaning of the filtering medium forming a part thereof when the pressure of the liquid to be filtered drops or is negligible. The filter comprises a casing having an inlet and outlet and a filtering unit within the casing and in communication with the inlet opening. The filtering unit is composed of a flexible cylinder of filtering medium closed by two end members, one of which is provided with an opening corresponding to the inlet opening of the casing. When liquid to be filtered is introduced into the unit under pressure, the unit is expanded and the liquid passes through the medium leaving impurities deposited thereon in the form of a cake. When the pressure of the liquid being filtered drops the unit contracts or collapses due to gravity or other agency, folding the medium in such a manner as to dislodge the cake of impurities, the particles of which settle to the bottom of the unit.

A more comprehensive understanding of the features and merits of the invention can be obtained by reference to the accompanying drawings illustrating the preferred embodiment of the same wherein, Figure 1 is an elevation of a filter embodying the invention, with a portion of the casing broken away and showing the unit in expanded position, Figure 2 is a similar view showing the unit in contracted or collapsed position, Figure 3 is a view similar to Fig. 1 of a modification and Figure 4 is a view similar to Fig. 2 of the modification illustrated in Fig. 3.

Referring now to the drawings, 10 represents a cylindrical casing having an inlet opening 11 and outlet opening 12 and a removable end or top 13. Liquid to be filtered, such as oil, is fed into the filter through a suitable piping arrangement 14 and 15 while a similar piping arrangement 16 and 17 serves to convey the filtered matter from the casing.

Disposed within the casing is a filter unit 18 composed of end members 19 and 20 having a substantially cylindrical filtering element 21 secured therebetween. The element 21 may be constructed of any filtering medium, such as filtering cloth, which possesses sufficient flexibility to permit expansion of the unit, as shown in Fig. 1 and contraction or collapse thereof as shown in Fig. 2.

In order that the liquid to be filtered may be introduced into the unit 18 the lower end 20 thereof is provided with a pipe like extension 22 threaded both internally and externally and of such size as to fit snugly in the intake opening 11 of the casing 10. A nut 23 engaging the external threads of the extension 22 holds the member 20 firmly against the bottom of the casing insuring a fluid-tight joint. The inlet pipe 14 is screwed into the extension 22 an amount sufficient to allow the end of the pipe to extend a short way into the interior of the unit as shown in the drawings.

In the operation of the filter shown in Figures 1 and 2 let it be assumed that the unit 18 is in the position shown in Fig. 2. Liquid to be filtered, such as oil, is then introduced into the unit 18. As the oil is fed into the unit the resistance of the filtering medium 21, i. e. its resistance to the passage of the oil therethrough, is greater than the resistance due to gravity of the end member 19 with the result that that member is gradually forced upwardly until the unit is completely expanded as shown in Fig. 1. At this point the expansive resistance of the unit exceeds the resistance of the filtering medium and the oil is consequently forced through the medium, thereby becoming filtered. The filtered oil passes from the casing through the outlet opening 12 and piping arrangement 16, 17.

As the oil is forced through the medium, impurities and refuse remaining in the unit may form a cake on the inside of the medium, in time forming a cake of such thickness as to render the medium useless as such. In systems wherein the pressure of the matter to be filtered varies, such as automobile lubricating systems, this objectionable feature is overcome by the present invention. As the pressure of the oil decreases, the weight of the top member 19 causes it to descend, contracting the unit and causing the collapse or folding of the medium 21 as shown in Fig. 2. As the medium folds the cake adhering thereto breaks up and the particles thereof sink to the bottom of the unit, leaving the medium in condition to permit the passage of liquid therethrough in the manner described before. By extending the inlet pipe 14 a short way into the interior of the unit, the particles of cake settle around it and blocking or clogging of the inlet passage is prevented.

When so desired the entire unit may be removed from the casing and completely disassembled for cleaning or replacement of parts.

The modification shown in Figs. 3 and 4 is similar to that illustrated in Figs. 1 and 2 with the exception that the inlet to the casing is provided at the top thereof as compared with the bottom arrangement previously described. Parts corresponding to those previously described are given the same reference characters with the addition of a prime to each number. In this modification it is not necessary to extend the pipe 14' into the interior of the filtering unit on account of the rearrangement of the inlet opening. Inasmuch as the force of gravity cannot be utilized for causing the contraction or collapse of the filtering unit, a spiral spring 30 extending between the two end members 19' and 20' serve as a means for causing contraction of the unit 18'.

The operation of the modification is the same as that described in connection with Figs. 1 and 2. Oil is fed into the filtering unit against the resistance of spring 30 until it is fully expanded, at which time the oil is forced through the filtering medium 21'. As soon as the pressure of the incoming oil is reduced or stopped the spring 30 causes the contraction of the unit, breaking loose the impurities or filter cake, which settles to the bottom of the unit in the manner hereinbefore explained.

It is to be understood that the present invention is capable of modification. The casing and filtering unit need not necessarily be of cylindrical shape but may be of any desired shape. The end members of the unit may be of metallic substances or of any substance desired, those illustrated in the drawings being of metallic construction, merely to add weight to the device for aiding in the expansion of the unit.

Having thus described my invention, what I claim as new and desire to secure by Letters Patent of the United States is:

1. A self-cleaning filter comprising a casing having an inlet and an outlet, and a filter unit within said casing, said unit being composed of substantially rigid end members and a flexible filtering medium extending therebetween, one of said end members being connected to the inlet of said casing.

2. A self-cleaning filter comprising a casing having an outlet opening, a filter unit within said casing, said unit being composed of substantially circular shaped rigid end members and a flexible filtering medium extending therebetween and secured thereto, one of said end members being provided with an opening, and an inlet pipe communicating with the interior of the filtering unit.

3. A self-cleaning filter comprising a casing having an inlet and an outlet, a filtering unit within said casing and connected to said inlet, said unit being composed of similarly shaped end members joined by a flexible filtering medium, and resilient means within said unit for normally holding said unit contracted.

4. A self-cleaning filter comprising a casing having an outlet opening, and an aperture located substantially centrally of one end thereof, a filter unit within said casing, said unit being composed of substantially circular shaped rigid end members and a flexible filtering medium extending therebetween and secured thereto, one of said rigid end members being provided with a neck fitting in said aperture and an inlet pipe communicating with the interior of said filtering unit through said neck.

In testimony whereof, I have signed my name to this specification.

ROBERT P. F. LIDDELL.